UNITED STATES PATENT OFFICE.

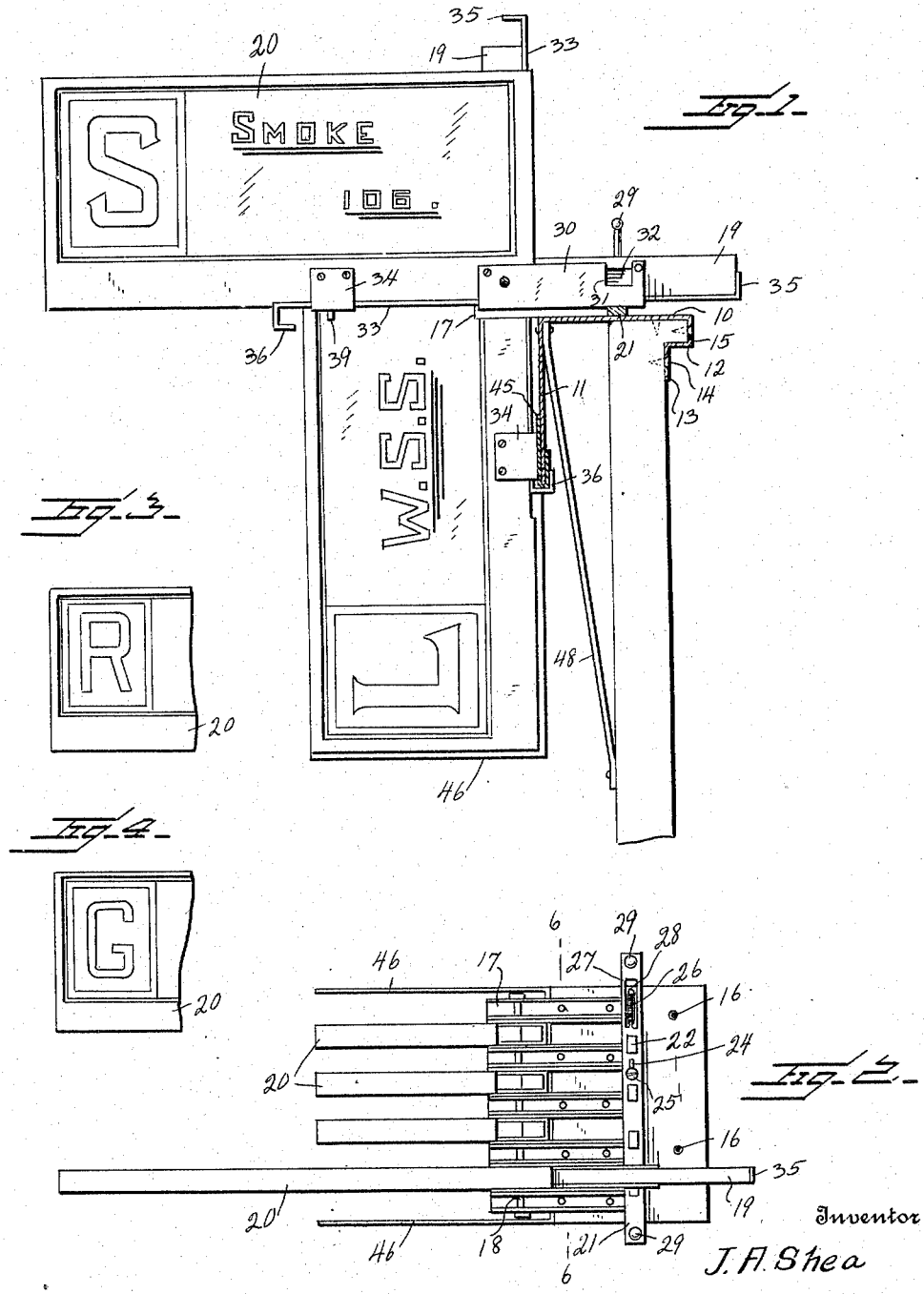

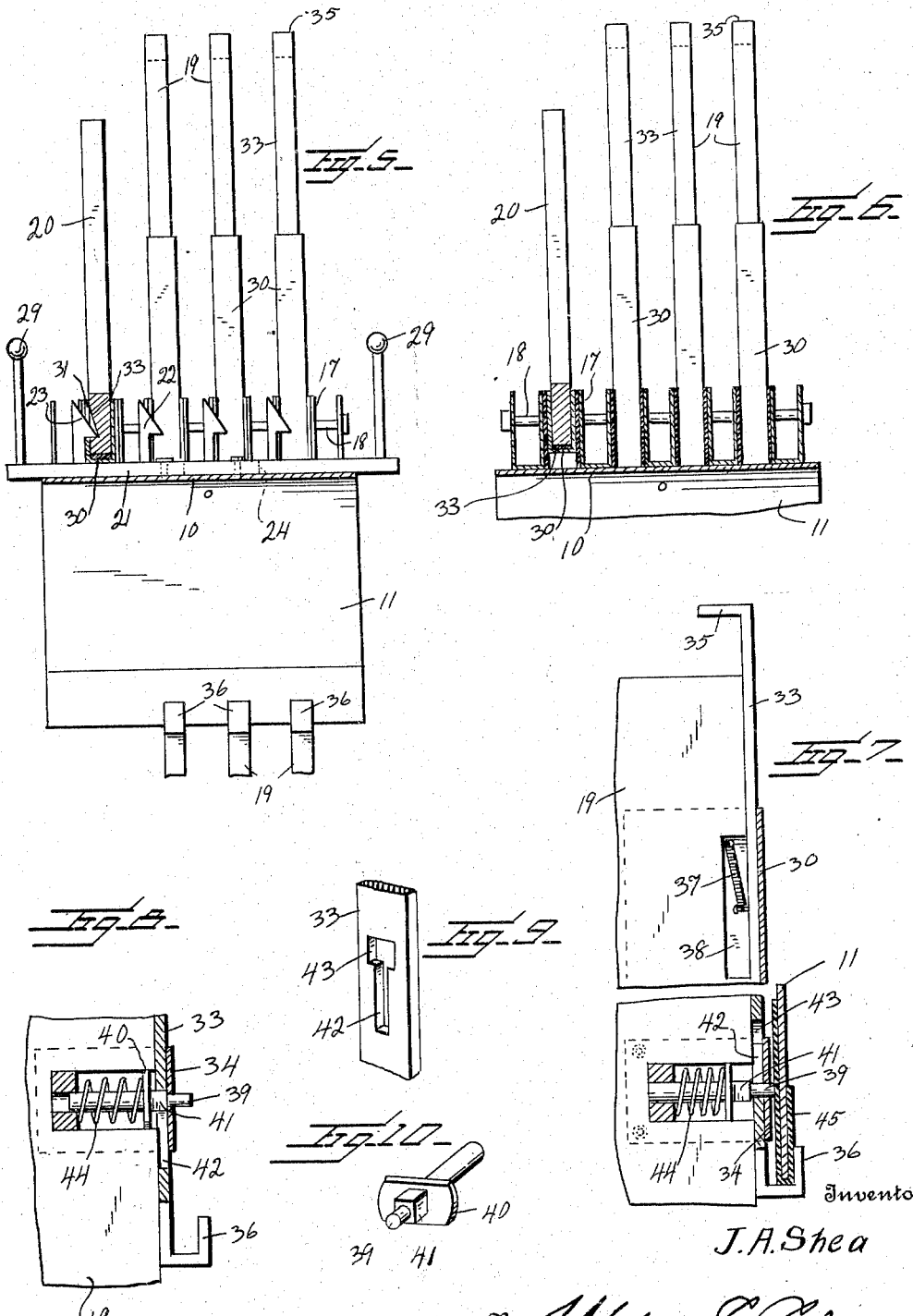

JOHN A. SHEA, OF WILKES-BARRE, PENNSYLVANIA.

DIRECTION-SIGNAL FOR AUTOMOBILES.

1,308,198.

Specification of Letters Patent.

Patented July 1, 1919.

Application filed February 17, 1919. Serial No. 277,620.

*To all whom it may concern:*

Be it known that I, JOHN A. SHEA, a citizen of the United States, residing at Wilkes-Barre, in the county of Luzerne and State of Pennsylvania, have invented certain new and useful Improvements in Direction-Signals for Automobiles, of which the following is a specification, reference being had to the accompanying drawings.

This invention relates to direction signals adapted for use on automobiles and other power operated cars or vehicles for the purpose of indicating the direction which the car is about to take, or whether the car is about to stop or go ahead, and particularly to that class of signals of this character wherein a plurality of semaphore or signal arms are used normally supported in a concealed position but adapted to be shifted to a display position.

The general object of my invention is to provide a simply constructed and easily operated signal of this character which is adapted to be used not only on automobiles but on all sorts of vehicles, wagons, cars, etc., and which is so designed that it may be used either for indicating the direction or movements of the vehicle, or may be used for the purpose of displaying advertisements, or may be used for both displaying advertisements and indicating the movements of the vehicle.

A further object of the invention is to provide a construction of this character which is adapted to be readily mounted upon automobiles or other vehicles without injury to the vehicle, and in this connection to provide a supporting bracket with a plurality of signal arms pivotally connected to the bracket, the signal arms being normally disposed in a concealed position, and provide manually operable means for unlatching the signal arms and rotating them to a projected position, and means automatically locking the signal arms in their projected positions, said locking means, however, being readily detachable from the signal arm to permit its return under the action of gravity to its normal position.

A further object is to improve the details of construction and arrangement of parts in devices of this character so as to render them more positive of operation, reduce the number of parts, and render them relatively cheap of construction.

Other objects will appear in the course of the following description.

My invention is illustrated in the accompanying drawings, wherein:—

Figure 1 is a side elevation of a signaling apparatus constructed in accordance with my invention, the bracket being in section;

Fig. 2 is a top plan view of the construction shown in Fig. 1;

Figs. 3 and 4 are fragmentary elevations of the signal targets;

Fig. 5 is a rear elevation, one of the signal arms being partly in section;

Fig. 6 is a fragmentary vertical sectional view on the line 6—6 of Fig. 2;

Fig. 7 is a fragmentary elevation of one of the signals, the parts being in section;

Fig. 8 is a like view to Fig. 7 showing the latching pin projected;

Fig. 9 is a perspective view of a portion of the locking rod; and

Fig. 10 is a perspective view of the latching pin.

Referring to these drawings, 10 designates a bracket which may be made of sheet metal or other suitable material, but which is preferably of sheet metal, this bracket being angular in form to provide a downwardly extending apron 11 at one edge of the bracket and at the other edge the bracket is bent downwardly and then inwardly, as at 12, and then downwardly, as at 13, this downwardly extending portion being formed with openings for the reception of screws 14. The bracket is also formed with additional openings, as at 15 and 16, for the reception of screws. These openings are preferably countersunk so that the screws will lie flush with the bracket.

Mounted upon the upper face of the bracket are a plurality of U-shaped spacers 17 disposed in spaced relation to each other and riveted or otherwise attached to the bracket and projecting beyond the bracket. Extending across the projecting portions of these spacers is a pintle 18.

Pivoted between a pair of these spacers 17 and upon the pintle 18 are the signal arms 19. The pintle 18 does not pass through the middle of the signal arm, but nearer one end than the other. The longer end of the signal arm is widened, as at 20, to provide for the carriage of signs or signaling indicia, and this widened portion 20 of each signal arm has an area of such size that the signal or advertisement or other matter placed thereon may be printed in bold type which may be seen at a long distance. These signal arms are adapted to be turned from a vertical position to a horizontal position or released and will swing down by gravity to a vertical position, that is a position parallel to the apron 11.

For the purpose of holding the signal arms in their projected positions, that is a horizontal position, I provide the locking bar 21. This bar is provided with a plurality of upwardly projecting detent hooks 22 having beveled, upper faces 23. There are as many of these hooks 22 as there are signal arms. The bar 21 is longitudinally slotted at a plurality of points, as at 24, and pins, screws, or other guides 25 pass through the slot and into the plate forming the bracket 10. These pins or screws are, of course, headed so as to prevent any detachment of the locking bar, but permit the locking bar to slide longitudinally to an extent determined by the length of the slots 24. The spring 26 is disposed in a relatively long slot 27 formed in this locking bar, the spring being attached at one end to a pin 28 on the outer end of the bracket, and at its other end to the locking bar. The bar is always urged in the direction of the hooks 22, or it may be shifted in the opposite direction. To provide means for shifting it in the opposite direction, I arrange upon the locking bar, the upwardly projecting handles 29. Normally, the hooks are disposed with their bills projecting about half way across the paths of movement of the signal arms 19.

It is desirable to provide means for locking the signal arms in their lowered or undisplayed position, or locking the signal arms in their raised or horizontal position. To secure the last named result, I mount upon each arm 19 the U-shaped member 30 which embraces the arm and is held thereto by screws, and this member is cut away at one end, as at 31, and the arm itself is formed with a recess 32, the bottom of the recess coinciding with the edge wall of the cut away portion 31 and the wall of the recess then extending outwardly and laterally. When the signal arm is drawn to a horizontal position, it will strike the beveled edge of the end of the corresponding hook 22 which forces the locking bar 21 laterally and then the bar will spring back into place again and the hook will hold the signal arm in its horizontally projected position. When it is desired to permit the signal arm to drop to its undisplayed position, the locking bar 21 is shifted laterally to release the hook, whereupon the signal arm swings downward.

It is desirable to lock the signal in its downwardly disposed position and, therefore, I dispose against the rear face of each arm 19, a locking rod 33. This locking rod extends between the U-shaped member 30 and the arm 19 and is additionally held to the back of the signal arm by means of a U-shaped member 34. This locking bar at its upper end is angularly bent, as at 35, to form a finger hold and, as before stated, is slidingly supported against the arm 19 by the U-shaped members 30 and 34. The lower end of the locking bar or rod 33 is hooked, as at 36, and this hook in one position of the locking rod or bar 33 engages beneath the lower edge of the apron 11. This locking rod 33 is urged to a raised or locking position by a spring 37 disposed within a recess 38 in the arm 19, this spring being connected at one end to one wall of the recess and at its opposite end to the locking rod 33. This recess is entirely housed and concealed by the U-shaped member 30. This spring 37, therefore, tends to pull the locking bar upward, but when the locking rod 33 is pressed downward, the hook 36 will be released from the apron and the signal arm may be turned to a horizontal position and locked by its engagement with the appropriate locking hook 22.

Now when the locking rod 33 has been pushed downward so as to release the hook 36, it is necessary that it should be held in this released position until the signal returns to its undisplayed or vertical position, and then it is necessary that this locking rod shall be automatically released and drawn upward by the spring to cause the hook 36 to engage the apron 11. To this end I mount within a recess in the arm 19 a spring pressed latch pin 39 having thereon a head 40, the shank of this pin extending outward from the head 40 and the base of this shank being formed to provide a square shoulder 41. The shank of the pin is round and the shoulder is square and the shoulder projects out in all directions from the shank of the pin. The locking rod 33 is formed with a longitudinally extending slot 42, that portion of the slot remote from the hook 36 being enlarged, as at 43, this enlargement being square and having an area slightly larger than the square shoulder 41. The body of the slot 42, however, has a width less than that of the square shoulder, that is a width just sufficient to permit the projection of the shank of the pin 39. A spring 44 urges the pin outward. Now when the parts are in the position shown in Fig. 1, with the signal undisplayed and the hook 36 engaging beneath the apron, the shank of the pin 40 is disposed in the body portion of the slot 42, but when the locking rod is moved downward by hand, the square portion 43 of the slot 42 will come into alinement with the square shoulder 41, and when this occurs the spring 44 will force the pin outward and the square shoulder 41 will engage in the square opening 43, thus locking the rod 33 in its depressed position (see Fig. 8). The signal may then be turned to its display position and when the signal is released and swings by gravity to its undisplayed position, that is its vertical position, then as the end of the pin 39 strikes the apron 11, the pin will be forced inward so as to carry the shoulder 41 out of its engagement with the square recess 43, and as soon as this occurs, the spring 37 will act to urge the rod 33 upward, causing the hook 36 to engage beneath the apron. Thus the signal is automatically locked when shifted to its display position and automatically locked when shifted to its concealed position and is manually unlocked in the first instance by pulling laterally on the locking bar 21 and in the second instance by depressing the locking rod 33.

I do not wish to be limited to any particular form for the signals or semaphores 20. Preferably, however, they will be constructed of hard fiber, as this material is not likely to warp and if painted or otherwise coated with waterproof material, will stand the weather very well, and such material will not swell. The semaphores may be of any desired size, shape, or area, but they should be large enough to contain relatively large figures, letters, or other indicia. Preferably, the end of the signal will contain a letter indicating the proposed movement of the automobile as, for instance "R" for "Right", "L" for "Left", or "S" for "Stop", and preferably there will be four of these signal arms covering movements to the right, left, stopping the automobile, and the starting of the automobile, which may be indicated by the letter "F" or any other suitable letter. The entire word, "Stop", "Start", "Right", or "Left" may be placed upon the signal, but if this is not done, then only the initial letter may be placed upon the signal and the remainder of the space on the signal semaphore may be occupied by advertising matter, as indicated in the drawing. I do not wish to be limited, however, to the arrangement of the advertising matter or the manner in which it is applied to the semaphore or target, or to the material from which this semaphore or target is to be made.

Preferably, buffers 45 will be disposed on the outer edge face of the apron so that the signal may drop by gravity to its concealed position without striking the apron too violently, these buffers which may be of rubber, leather, felt, or other suitable material, acting to cushion the blow. Preferably, also, the outer faces of the spacing members 17 will be covered with leather, felt or like material so as to prevent the semaphore arms from rattling and yet permit the semaphore arms to move easily. The apron 11 will preferably be formed to provide laterally disposed wings 46 which will conceal the signal arms or semaphores when they hang down and are not in operation.

Preferably, a supporting bracket 48 is attached to the bottom of the door or wall upon which the signal is mounted and extends upward and outward and is attached by bolting or otherwise. The supporting plate 10 or the depending apron 11 is preferably at the junction of these two portions. This bracket, which is in the form of a rod, extends down to the bottom of the door so as to be attached slightly to the frame portion of the door.

It will be noted that the spacing members 17 are sufficiently wide so that the locking hooks 22 will pass behind these spacing members when the locking bar 21 is moved laterally without these locking hooks passing in front of any other signal arm, and preferably an oxidized metal frame will be placed around the edges and ends of each signal arm to entirely cover the edges and margin of the signal arm as a border.

The operation of my invention will be obvious from what has gone before. The driver of a vehicle wishing to signal that he will turn to the right, presses down the locking rod 33 corresponding to this signal. This releases the hook 36 from its engagement with the apron, allowing the arm to be brought upward and the locking arm brought downward between the spacing members until the handle of the signal, as it may be termed, strikes the locking hook 22. This catches in the recess 32 and the arm is then in signaling position and will remain in that position until released. When it is desired to release the signal, the locking bar 21 is pushed laterally, thus releasing the hook 22 from its engagement with the signal arm and then the signal will drop by gravity to its depending position and will be locked by the means heretofore described.

This device is particularly constructed for mounting upon the side wall of an automobile as, for instance, upon the door or upon a bracket mounted on an automobile, but may also be used on wagons, cars, or other vehicles. Of course, it will be understood that the signaling or advertising matter placed upon the targets, or semaphores, should be in contrasting colors with the background and that the letters should be very plain and as large as possible.

While I have illustrated a construction which I have found to be thoroughly effective in practice, it will be obvious that many

I claim:—

1. A direction signal including a support, a signal arm pivoted to the support for movement in a vertical plane into or out of a display position, and a locking member, movable in a direction at right angles to the plane of movement of the signal arm and resiliently urged into a locking position but manually shiftable out of said locking position, the signal arm having a recess in its side face with which said locking member engages when the signal arm is swung into a horizontal display position.

2. A direction signal including a support, a plurality of signal arms pivoted to the support for independent movement in a vertical plane into or out of a display position, each signal arm having a recess in one side face, a locking bar slidingly mounted on said support and having upwardly extending latch members, each formed to provide a laterally projecting hook having a beveled upper face, and resilient means urging the bar in a direction to carry its hook into the path of movement of the several signal arms, the bar being manually shiftable in the opposite direction to release the signal arms.

3. A direction signal including a support having a depending portion, a signal arm pivoted to the support for movement in a vertical plane into or out of a display position, means for locking the arm in a depending position comprising a hook-shaped locking rod mounted upon the arm and adapted to engage behind the depending portion of the support and resiliently urged into its engaging position, said locking rod being manually shiftable to disengage the hook from the support.

4. A direction signal including a support having a depending portion, a signal arm pivoted to the support for movement in a vertical plane into or out of a display position, means for locking the arm in a depending position comprising a hook-shaped locking rod mounted upon the arm and adapted to engage behind the depending portion of the support and resiliently urged into its engaging position, said locking rod being manually shiftable to disengage the hook from the support, and means automatically latching the locking rod in its released position, said latching means being automatically shifted to an inoperative position upon the approach of the signal arm into contiguity with the depending portion of the support whereby to release the locking rod.

5. A direction signal including a support, a signal arm pivoted to the support for movement into or out of a display position, means automatically locking the arm in a display position, said means being manually shiftable to release said arm, a locking member carried by the arm and operating to lock it in an undisplayed position, means acting to latch said locking member in an inoperative position when the locking member has been shifted to release the arm, and means for automatically releasing said latching means when the arm has returned to its undisplayed position.

6. A direction signal including a supporting plate having a depending portion or apron, the plate being adapted to be mounted upon the upper edge of a wall, a plurality of signal arms pivotally mounted upon said plate for movement into or out of a display position, each of said arms having a notch in one side face, a transversely extending locking bar slidably mounted upon the support and having upwardly extending hook-shaped keepers formed with beveled upper ends, each of said keepers coacting with the notch in one of the signal arms to hold the signal arm in display position, a spring urging said bar in a locking position, the bar being manually shiftable out of such position to release a signal, a locking rod slidably mounted upon the rear edge of each arm and having a handle at one end and at its other end being formed to engage with said apron to lock the signal in its depending undisplayed position, said locking rod being manually shiftable to release the signal but automatically engaging with the apron when the signal is released from its display position and returns to its undisplayed position.

7. A signal of the character described including a supporting member having a downwardly depending apron, a plurality of signal arms pivotally mounted upon the supporting member for movement in a vertical plane, manually operable means for locking said arms in a horizontal plane, and means for locking each of the arms in a vertical undisplayed position, a locking rod slidably mounted upon the back of each arm having a hook-shaped terminal end at one end adapted to engage behind the lower edge of the apron, a spring normally urging said rod upward, said rod being shiftable downward to release its engagement with the apron, the rod being formed with a longitudinally extending slot enlarged at one end, and a spring pressed pin carried upon each arm in conjunction with the slot, said pin having a shoulder wider than the body portion of the slot but movable into the enlarged portion of the slot when the locking rod has been depressed to release the hook from the apron to thereby latch the locking rod in its inoperative position, said pin at this time projecting beyond the locking rod and adapted to be engaged by the apron when the signal swings to a depending position to thereby release the locking rod to permit its return to its locking position.

8. A signal of the character described including a supporting plate adapted to be attached to the upper edge of a wall and having a depending apron, a plurality of U-shaped spacing members mounted upon the plate, a plurality of signal arms, each mounted between a pair of the spacing members, a pintle extending through the spacing members and said arms, each of said arms being formed on its side face with a notch, a transversely slidable locking bar mounted upon the plate and having handles and upwardly extending hook-shaped detents, each adapted to engage with the notch in the corresponding arm to thereby lock any arm in a horizontal display position, a longitudinally slidable locking rod mounted upon the back of each arm and having a terminal hook adapted to engage behind the apron when the signal arm is in a vertical undisplayed position, a spring urging each locking rod upward, said locking rod being manually shiftable downward to release its hooked terminal from engagement with the apron, means for automatically latching the locking rod in its released position, said means including a member projecting behind the face of the locking rod when the locking rod is released and adapted to be engaged by said apron to thereby shift the latching means to an inoperative position to render said locking rod again operative.

In testimony whereof I hereunto affix my signature in the presence of two witnesses.

JOHN A. SHEA.

Witnesses:
WILLIAM J. STEVENS,
RICHARD H. BOOTH.

Copies of this patent may be obtained for five cents each, by addressing the "Commissioner of Patents, Washington, D. C."